(12) United States Patent
Planche et al.

(10) Patent No.: US 12,437,401 B2
(45) Date of Patent: Oct. 7, 2025

(54) SYSTEMS AND METHODS FOR DETERMINING ANATOMICAL DEFORMATIONS

(71) Applicant: Shanghai United Imaging Intelligence Co., Ltd., Shanghai (CN)

(72) Inventors: Benjamin Planche, Briarwood, NY (US); Pierre Sibut-Bourde, Gex (FR); Ziyan Wu, Lexington, MA (US); Meng Zheng, Cambridge, MA (US); Zhongpai Gao, Rowley, MA (US); Abhishek Sharma, Boston, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 339 days.

(21) Appl. No.: 18/202,588

(22) Filed: May 26, 2023

(65) Prior Publication Data

US 2024/0394870 A1   Nov. 28, 2024

(51) Int. Cl.
  *G06T 7/00* (2017.01)
  *G06T 7/10* (2017.01)
  *G06T 7/11* (2017.01)

(52) U.S. Cl.
  CPC .............. *G06T 7/0012* (2013.01); *G06T 7/10* (2017.01); *G06T 2207/20081* (2013.01); *G06T 2207/20084* (2013.01)

(58) Field of Classification Search
  None
  See application file for complete search history.

(56) References Cited

U.S. PATENT DOCUMENTS

2023/0169657 A1*   6/2023   Wu .................... G06N 3/084
                                                              382/128

FOREIGN PATENT DOCUMENTS

| EP | 4099208 A1 | 12/2022 |
|---|---|---|
| WO | 2021225680 A1 | 11/2021 |
| WO | 2022104299 A1 | 5/2022 |
| WO | 2022227073 A1 | 11/2022 |

* cited by examiner

*Primary Examiner* — Beniyam Menberu
(74) *Attorney, Agent, or Firm* — Zhong Law, LLC (57) ABSTRACT

The physical characteristics of one or more anatomical structures of a person may change in accordance with conditions surrounding the determination of such physical characteristics. Machine learning based techniques may be used to determine a template representation of the one or more anatomical structures that may indicate the physical characteristics of the one or more anatomical structures free of the impact imposed by changing conditions. The template representation may then be used to predict the physical characteristics of the one or more anatomical structures under a new set of conditions, without subjecting the person to additional medical scans.

20 Claims, 6 Drawing Sheets

FIG. 1

FIG. 4

SYSTEMS AND METHODS FOR DETERMINING ANATOMICAL DEFORMATIONS

BACKGROUND

Organ shape, location, and/or orientation determination is an important aspect of many clinical applications including, for example, pre-operative planning and radiation therapy. Modern medical imaging technologies such as X-ray, magnetic resonance imaging (MRI), or computed tomography (CT) may provide means for making such a determination. But since the physical characteristics of an organ reflected in a medical scan may be affected by conditions associated with the scan procedure, comparative studies of the organ based on medical scans acquired at different times (e.g., pre-treatment versus post-treatment) may be challenging if the scans are taken under different conditions (e.g., the patient may be in different poses and/or body shapes during the imaging procedures, the scans may be taken during different physiological cycles of the organ, etc.). Ways to alleviate the challenge may include scanning the patient more frequently so as to minimize the conditional changes between consecutive scans, and/or requiring that the patient strictly maintain the same position and/or pose during different scan procedures. These measures may not only be cumbersome and expensive, but also subject the patient to radiation that may be avoided if there are ways to automatically predict the deformation of an organ under a given set of conditions.

SUMMARY

Described herein are systems, methods, and instrumentalities for automatically predicting the deformation of one or more anatomical structures under a given set of conditions. An apparatus used to make the prediction may include at least one processor configured to obtain a first representation of one or more anatomical structures (e.g., organs) of a person, wherein the first representation may be derived based on a medical scan image of the person and may indicate respective geometric characteristics (e.g., shapes, locations, volumes, orientations, etc.) of the one or more anatomical structures under a first set of conditions. The at least one processor may be further configured to determine, based at least on the first representation of the one or more anatomical structures acquired under the first set of conditions, a feature descriptor that may encode one or more intrinsic properties of the one or more anatomical structures independent of the first set of conditions. The at least one processor may then obtain information regarding a second set of conditions and generate a second representation of the one or more anatomical structures that may indicate the respective physical characteristics of the one or more anatomical structures under the second set of conditions. The second representation may be generated based at least on the feature descriptor described above, a first machine-learning (ML) model trained for mapping a three-dimensional (3D) space associated with the first representation of the one or more anatomical structures to a template 3D space associated with the one or more anatomical structures, and a second ML model trained for predicting respective distances of a point in the template 3D space to the one or more anatomical structures.

In examples, the first representation of the one or more anatomical structures obtained by the apparatus may include a first segmentation mask for the one or more anatomical structures, while the second representation of the one or more anatomical structures determined by the apparatus may include a second segmentation mask for the one or more anatomical structures. In examples, the 3D space associated with the first representation of the one or more anatomical structures may include a plurality of discrete 3D points associated with the one or more anatomical structures, while the template 3D space associated with the one or more anatomical structures may include a plurality of continuous 3D points associated with the one or more anatomical structures.

In examples, the at least one processor being configured to generate the second representation of the one or more anatomical structures may comprise the at least one processor being configured to determine whether a point in the template 3D space may belong to one of the one or more anatomical structures based on the respective distances (e.g., predicted by the second ML model) of the point to the one or more anatomical structures. For example, the respective distances of the point in the template 3D space to the one or more anatomical structures may be predicted as signed distances between the point and respective surfaces of the one or more anatomical structures, and the at least one processor may be configured to determine that the point in the template 3D space belongs to the one of the one or more anatomical structures if the predicted distance between the point and the surface of the one of the one or more anatomical structures is a negative distance. In examples, the first representation and the second representation may be associated with two or more anatomical structures, and a constraint may be imposed on the second ML model (e.g., during training and/or usage) such that no more than one of the signed distances between the point and the respective surfaces of the two or more anatomical structures may have a negative value.

In examples, the first ML model and the second ML model described herein may be trained jointly based at least on an input representation of the one or more anatomical structures that may include a plurality of discrete points associated with the one or more anatomical structures, wherein, during the joint training of the first ML model and the second ML model, the first ML model may be used to predict a continuous 3D space associated with the one or more anatomical structures based at least on the input representation, the second ML model may be used to predict a signed distance function (SDF) field associated with the continuous 3D space, and respective parameters of the first ML model and the second ML model may be adjusted based on a difference between respective ground truth SDF values associated with the plurality of discrete points of the first representation and corresponding SDF values sampled from the SDF field.

In examples, the first set of conditions described herein may include one or more of a first pose of the person, a first body shape of the person, or a first time value associated with the one or more anatomical structures of the person, while the second set of conditions may include one or more of a second pose of the person, a second body shape of the person, or a second time value associated with the one or more anatomical structures of the person. In examples, the feature descriptor described herein may include a feature vector comprising a plurality of real-valued parameters, the first representation and the second representation may be associated with two or more anatomical structures, and the respective geometric characteristics of the two or more anatomical structures may include respective shapes of the two or more anatomical structures.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings. A detailed description of illustrative embodiments will be described with reference to these figures. Although the description may provide examples of implementations, it should be noted that the details are intended to be illustrative and in no way limit the scope of the application. It should also be noted that, while the examples may be described in the context of a medical environment, those skilled in the art will appreciate that the disclosed techniques may also be applied to other environments or use cases.

Figure 1:
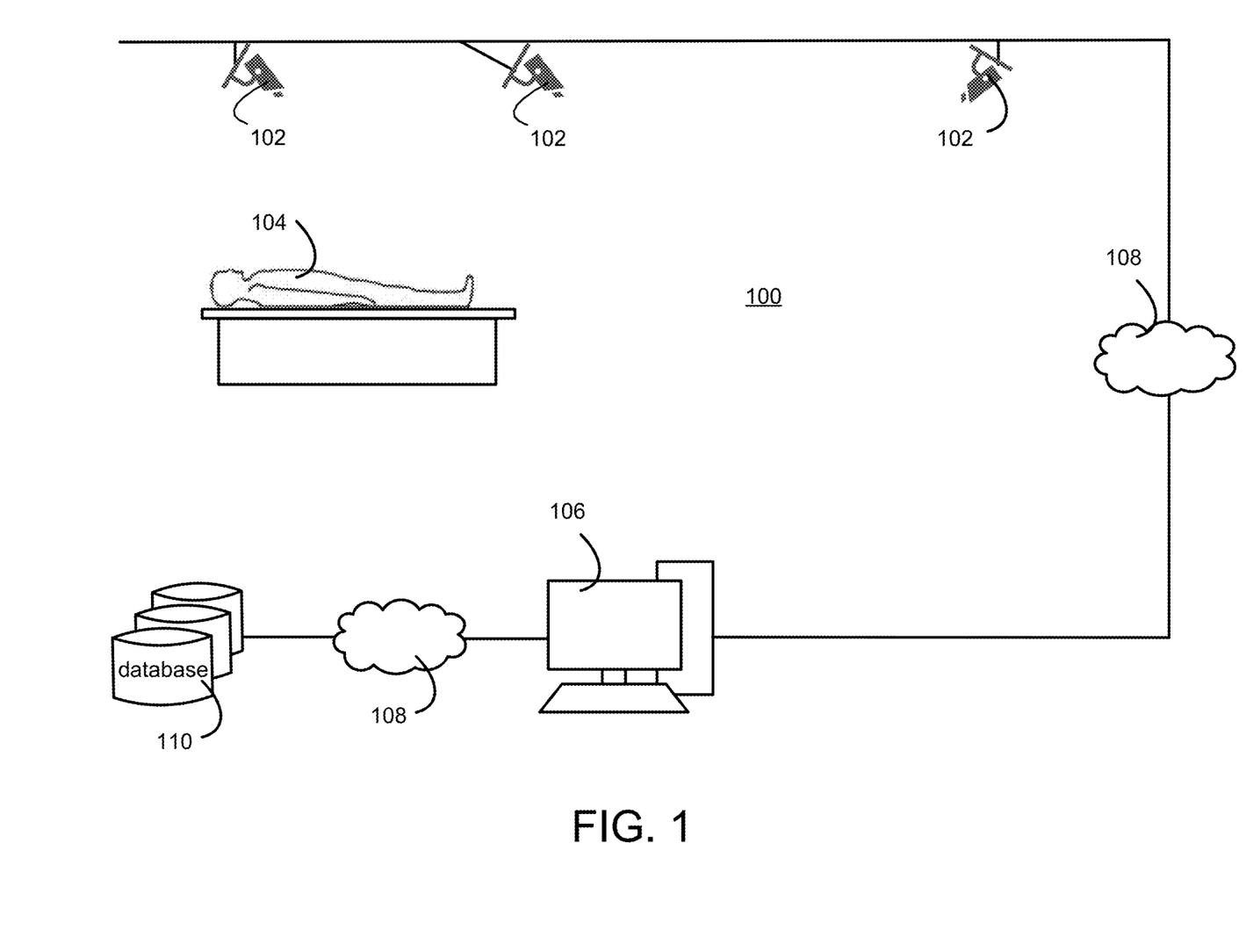
FIG. 1 is a simplified diagram illustrating an example environment that may be associated with embodiments of the present disclosure.

FIG. 1 is a simplified diagram illustrating an example environment 100 that may be associated with embodiments of the present disclosure. Environment 100 may be a part of a medical facility such as an examination room, a scan room (e.g., for MRI, X-ray, and/or CT) or an operating room (OR), and may be equipped with one or more sensing devices 102 configured to collect information that may be used to determine the conditions of a person 104 (e.g., a patient) and/or the environment 100. In some examples, the sensing device(s) 102 may include one or more cameras, one or more depth sensors, one or more thermal sensors, and/or one or more radar sensors that may be configured to capture images of the person 104 while the person is getting ready for or undergoing a medical procedure. In other examples, the sensing device(s) 102 may include other sensors or devices that may be configured to collect other information about the person 104 and/or the environment 100 including, for example, a time value associated with the progression of a medical treatment for the person (e.g., a radiation therapy), a time value associated with a body function of the person (e.g., a breathing or digestive cycle), etc.

Environment 100 may also include an apparatus 106 configured to be communicatively coupled to the sensing device(s) 102 via a communication network 108 and receive the information collected by the sensing device(s) 102. In examples, apparatus 106 may be assigned one or more processing tasks associated with the person 104, and may use the information received from the sensing device(s) 102, together with other information obtained by apparatus 106, to complete those tasks. For instance, apparatus 106 may be tasked with determining the geometric characteristics (e.g., shapes, locations, orientations, volumes, etc.) of one or more anatomical structures (e.g., organs, soft tissues, etc.) of the person 104 under a current set of conditions (e.g., pose, body shape, age, etc.) based on a previous medical scan image (e.g., MRI or CT scan) of the person captured under a different set of conditions (e.g., a different pose, body shape, age, etc.). In response to receiving such a task, apparatus 106 may use images captured by the sensing device(s) 102 to determine the current set of conditions (e.g., determine the pose and/or body shape of the person 104 based on a machine-learned image recognition model), further determine a representation (e.g., referred to herein as a first representation) of the one or more anatomical structures based on the previous medical scan image of the person, and generate another representation (e.g., referred to herein as a second representation) of the one or more anatomical structures to depict the geometric characteristics of the one or more anatomical structures under the current set of conditions (e.g., without subjecting the person 104 to another medical scan).

The representation of the anatomical structures described herein (e.g., the first or second representation referred to herein) may be generated in various forms. For example, the representation may include a heatmap or a segmentation mask (e.g., a binary segmentation mask) having a plurality of pixels or voxels, the respective values of which may indicate (e.g., via value-based color coding) whether or not the pixels or voxels are parts of the anatomical structures, and/or which specific anatomical structure that the pixels or voxels may belong to. In some examples, apparatus 106 may be configured to obtain the previous medical scan image of the person 104 and/or the conditions associated with the medical scan image from a medical records database 110, and generate the first representation of the one or more anatomical structures based on the obtained medical scan image. In other examples, apparatus 106 may provide the medical scan image of the person to another device or a human annotator, and have the other device or human annotator generate the first representation of the one or more anatomical structures based on the medical scan image (e.g., via automatic or manual annotation).

In examples, the first representation of the one or more anatomical structures may be generated using an artificial neural network (ANN) (e.g., such as a convolutional neural network (CNN)) training for segmenting the one or more anatomical structures from the medical scan image. The ANN may include one or more convolutional layers, one or more pooling layers, and/or one or more fully connected layers. Each of the convolutional layers may include a plurality of convolution kernels or filters configured to extract features from the medical scan image of the person 104. The convolution operations may be followed by batch normalization and/or line or non-linear activation, and the features extracted by the convolutional layers may be downsampled through the pooling layers and/or the fully connected layers to obtain a feature map or vector representing the extracted features. In examples, the ANN may further include one or more un-pooling layers and one or more transposed convolutional layers. Through the un-pooling layers, the down-sampled features extracted from the medical scan image may be up-sampled and the up-sampled features may be further processed through the transposed convolution operations to derive a denser feature map. The denser feature map may then be used to predict whether or not a pixel or voxel of the medical scan image is a part of the anatomical structures depicted in the medical scan image, and/or which specific anatomical structure that the pixel or voxel may belong to.

As explained above, the first representation of the one or more anatomical structures obtained based on the medical scan image of the person 104 may indicate the respective geometric characteristics (e.g., shapes, locations, volumes, orientations, etc.) of the one or more anatomical structures under a specific set of conditions (e.g., referred to herein as a first set of conditions). Apparatus 106 may determine this set of conditions, for example, by querying the medical records database 110 (e.g., each medical scan image stored in database 110 may be associated with a corresponding set of conditions). Based on the first representation of the one or more anatomical structures and the first set of conditions associated with the representation, apparatus 106 may determine a person-specific feature descriptor for the one or more anatomical structures, wherein the feature descriptor may encode intrinsic properties of the one or more anatomical structures independent of the first set of conditions. Since the feature descriptor may be disentangled from the variables (e.g., the person's pose, body shape, and/or body functions) that have conditioned the first representation of the one or more anatomical structures, the feature descriptor may serve as a condensed and condition agnostic representation of the one or more anatomical structures of the person 104, free of the impact of conditioning variables.

In examples, apparatus 106 may be configured to determine a mapping between a three-dimensional (3D) space associated with the first representation of the one or more anatomical structures and a template 3D space associated with the one or more anatomical structures based on the feature vector and a first machine-learning (ML) model. The 3D space associated with the first representation may be a discrete 3D space comprising a finite number of points associated with the one or more anatomical structures (e.g., depending on the resolution of the annotation), while the templated 3D space may be a continuous 3D space in which the geometric characteristics of the one or more anatomical structures may be defined by an infinite number of points and/or free from the influence of the variables that may have conditioned the first representation of the one or more anatomical structures. As will be described in greater detail below, the first ML model may acquire the ability to map a point in the discrete 3D space to a point in the template 3D space through a training process that utilizes a large dataset of paired anatomical structure representations acquired under different conditions.

In examples, apparatus 106 may be configured to determine which points in the template 3D space may belong to one of the one or more anatomical structures under a new set of conditions detected by the sensing device(s) 102 (e.g., referred to herein as a second set of conditions), and generate a second representation (e.g., a second segmentation mask) of the one or more anatomical structures based on the determination to indicate the respective geometric characteristics of the one or more anatomical structures under the new conditions. As will be described in greater detail below, apparatus 106 may be configured to determine whether a point in the template 3D space belongs to one of the one or more anatomical structures based on a second ML model that may be pre-trained for predicting the signed distances of the point to respective surfaces of the one or more anatomical structures under the new set conditions. If the predicted signed distance between the point and the surface of an anatomical structure has a negative value, apparatus 106 may determine that the point belongs to the anatomical structure (e.g., the point may be inside the anatomical structure) and may indicate so in the second representation. If the predicted signed distance has a positive value, apparatus 106 may determine that the point does not belong to the anatomical structure (e.g., the point may be outside the anatomical structure) and may indicate so in the second representation. As will be described in greater detail below, the second ML model may be trained jointly with the first ML model, and using these ML models, apparatus 106 may be capable of producing an updated depiction of the one or more anatomical structures of the person 104 without subjecting the person to additional medical scans.

Figure 2:
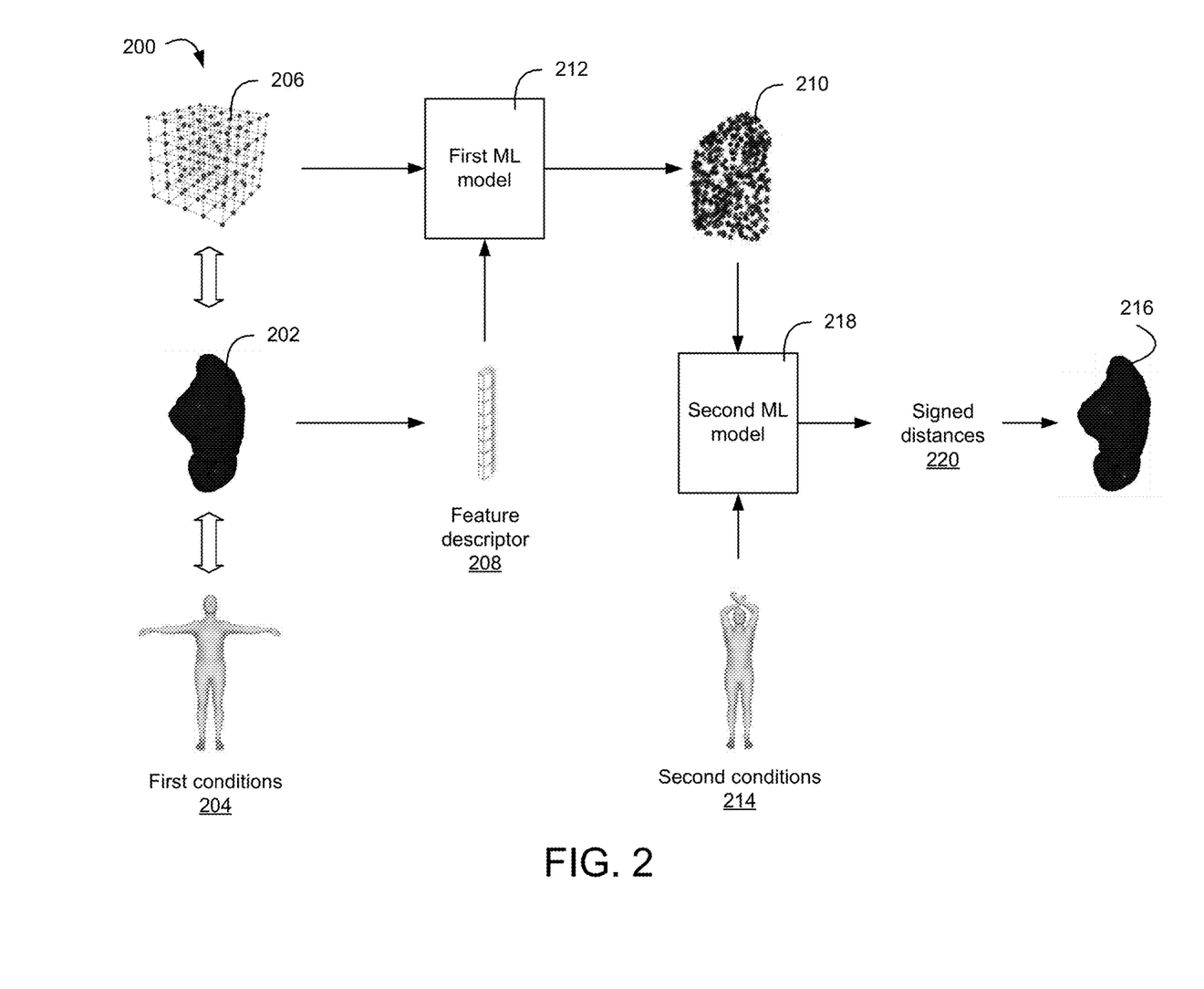
FIG. 2 is a simplified diagram illustrating an example process for predicting a representation of one or more anatomical structures of a person using machine-learning based techniques.

FIG. 2 illustrates an example process 200 for predicting a representation (e.g., a heatmap or segmentation mask) of one or more anatomical structures of a person using machine-learning based techniques. As shown in FIG. 2, the example process 200 may include obtaining a first representation 202 of one or more anatomical structures (e.g., different chambers of the human heart) of the person based on a medical scan image (e.g., an MRI image) that may depict the one or more anatomical structures under a first set of conditions 204. The first set of conditions 204 may, for example, include one or more of a pose of the person, a body shape of the person, a time value associated with a body function of the person (e.g., a breathing, cardiac or digestive cycle of the person), or a time value associated with a medical condition or treatment of the person (e.g., a stage of a radiation therapy) that may be retrieved (e.g., together with the medical scan image 202) from a medical records database.

In some examples, the first representation 202 of the one or more anatomical structures may be automatically generated using an artificial neural network (e.g., a CNN) as described herein, while in other examples the first representation may be obtained by manually annotating the original medical scan image. In at least the former scenarios, the first representation 202 may include a first heatmap (e.g., a 2D or 3D heatmap) or a first segmentation mask (e.g., a 2D or 3D segmentation mask) with color-coded pixels or voxels that may indicate respective geometric characteristics (e.g., shapes, locations, volumes, orientations, etc.) of the one or more anatomical structures based on values predicted by the ANN that may indicate whether the pixels or voxels form parts of the anatomical structures, and/or which specific anatomical structure that the pixels or voxels may belong to. Depending on whether a 2D representation or a 3D representation is used, the first representation 202 may be associated with a corresponding 2D or 3D space 206, in which the one or more anatomical structure may be represented by a finite number of discrete points (e.g., the total number of discrete points may depend on the resolution of the medical scan image and/or the annotation generated therefrom).

In examples, process 200 may further include determining, based at least on the first representation 202 of the one or more anatomical structures, a feature descriptor 208 that may encode one or more intrinsic properties of the one or more anatomical structures independent of the first set of conditions 204. The feature descriptor 208 may, for example, include one or more feature vectors (e.g., each comprising a plurality of real-valued parameters) representative of person-specific information regarding the one or more anatomical structures that may be disentangled from the first set of conditions 204 and subsequently used to recover (e.g., reconstruct) the geometric characteristics of the one or more anatomical structures under a different set of conditions.

In examples, process 200 may further include determining a mapping between the discrete 2D or 3D space 206 and a template 2D or 3D space 210 based on the first representation 202 and/or the feature descriptor 208. The template 2D or 3D space 210 may be denser (e.g., more continuous) than the discrete 2D or 3D space 206, and may define the geometric characteristics of the one or more anatomical structures (e.g., with an infinite number of 2D or 3D points) in a space independent of the first set of conditions 204. The mapping may be learned through training by a first artificial neural network (e.g., corresponding to a first ML model 212 shown in FIG. 2) based on a dataset of conditional medical scan images or segmentation masks associated with the one or more anatomical structures. Once trained and given a point P in the 2D or 3D discrete space 206 (e.g., corresponding to a pixel or voxel of the anatomical structures), the first ML model 212 may be used to determine a corresponding point P' in the template 2D or 3D space 210 that may reflect a deformation of point P free of the first set of conditions 204.

In examples, process 200 may further include generating, based at least on the mapping function realized via first ML model 212 and/or a second set of conditions 214, a second representation 216 (e.g., a second heatmap or segmentation mask) of the one or more anatomical structures that may indicate the respective geometric characteristics (e.g., shapes, locations, volumes, orientations, etc.) of the one or more anatomical structures under the second set of conditions 214. The second set of conditions 214 may be determined, for example, using one or more of the sensing devices described herein (e.g., sensing device(s) 102 of FIG. 1), and may include, for example, one or more of a pose of the person, a body shape of the person, a time value associated with the body function of the person (e.g., the breathing, cardiac or digestive cycle of the person), or a time value associated with the medical condition or treatment of the person (e.g., a stage or progression of a radiation therapy). In some examples, the second set of conditions may be different than the first set of conditions, while in some other examples, the second set of conditions may be the same as the first set of conditions. The second representation 216 may be generated based at least on a second ML model 218 trained to learn a deep implicit function, such as, e.g., a neural multi-entity signed-distance function (SDF), which may take, as inputs, a 2D or 3D point in the template 2D or 3D space 212 and the second set of conditions 214, and predict, as outputs, respective signed distances 220 of the 2D or 3D point (e.g., a pixel or voxel) to the nearest surfaces of the one or more anatomical structures in the template space 210. For instance, based on a template space associated with n anatomical structures (n may be greater than 1), the second ML model 218 may be trained (e.g., optimized) to learn an implicit function SDF(x)=z, where $x \in \mathbb{R}^3$ (for a 3D scan) or $x \in \mathbb{R}^2$ (for a 2D scans) may represent a 3D or 2D point, and $z \in \mathbb{R}^n$ may represent a corresponding vector of signed distances between the 3D or 2D point x and the surface of each anatomical structure. According to such a function, a distance $z_i$ corresponding to the signed distance between the 2D or 3D point x and the surface of anatomical structure i may have a positive value ($z_i > 0$) if x is outside of the anatomical structure i, have a negative value ($z_i < 0$) if x is inside the anatomical structure i, and have a value of zero ($z_i = 0$) if x is on the surface of the anatomical structure. Thus, a prediction about whether the 2D or 3D point x belongs to the anatomical structure i may be made based on the value of the signed distance $z_i$, and the second representation 216 may be generated (e.g., using matching cubes) based on the prediction to indicate the positioning and/or deformation of the one or more anatomical structures under the second set of conditions (e.g., under a different body shape or pose).

Figure 3A:
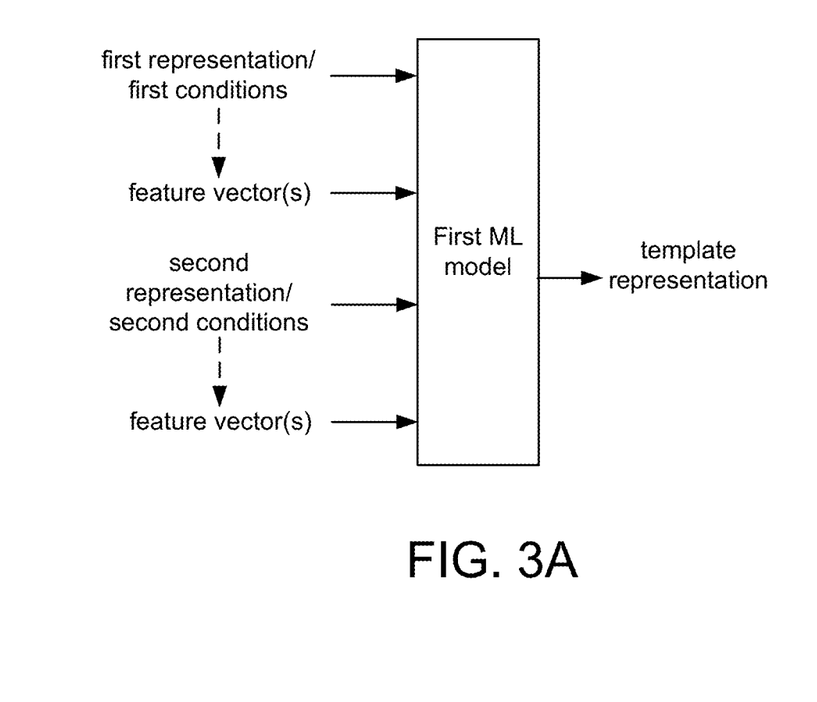
FIG. 3A is a simplified block diagram illustrating an example of training an ML model to learn a deformation function associated with one or more anatomical structures of a person.
Figure 3B:
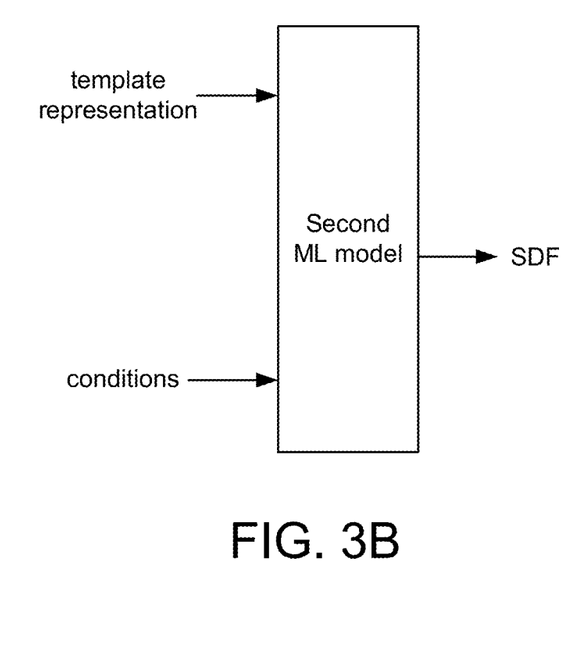
FIG. 3B is a simplified block diagram illustrating an example of training an ML model to learn a signed distance function (SDF) associated with one or more anatomical structures of a person.

FIG. 3A illustrates an example of training an ML model (e.g., first ML model 212 of FIG. 2) to learn the deformation of one or more anatomical structures based on a training dataset of paired representations (e.g., segmentation masks) of the one or more anatomical structures acquired under different conditions. FIG. 3B illustrates an example of training an ML model (e.g., second ML model 218 of FIG. 2) to learn an SDF associated with one or more anatomical structures based on a training dataset comprising template representations (e.g., segmentation masks) of the one or more anatomical structures and various sets of conditions. The ML models described herein may be implemented using an artificial neural network (ANN) capable of modeling a parametric and/or continuous function such as the SDF described herein. As an example, the ANN may include a neural ordinary differential equation (NODE) solver employing an auto-decoder architecture. As another example, the ANN may include a multilayer perceptron (MLP) network with periodic activation functions.

As shown in FIG. 3A, the first ML model (e.g., an artificial neural network used to implement the first ML model) may be trained using a dataset that may include a large number of paired representations of the target anatomical structures (e.g., chambers of the human heart) acquired under different conditions. Each pair of data records may, for example, include a first representation (e.g., a first heatmap or segmentation mask) of the target anatomical structures acquired under a first set of conditions and a second representation (e.g., a second heatmap or segmentation mask) of the target anatomical structures acquired under a second set of conditions. Using these paired training data, the artificial neural network used to implement the first ML model may learn the impact of a given set of conditions on the representation of the target anatomical structures, and may predict the deformation (e.g., via a template representation) of the target anatomical structures free of the impact. For example, during the training of the first ML model, the artificial neural network may be used to determine patient-specific feature vectors (e.g., the feature descriptor 208 of FIG. 2) from the first training representation and the second training representation, respectively, and use the determined feature vectors, together with the corresponding training representations, to predict a mapping between the 2D or 3D space associated with the training representations and a template 2D or 3D space associated with a template representation of the one or more anatomical structures. The feature vectors may encode condensed information about the anatomical structures, regardless of the conditions associated with the first and second training representations. The 2D or 3D space associated with the training representations may be patient and/or condition specific, while the template 2D or 3D space associated with the template representation may be patient and/or condition agnostic.

As shown in FIG. 3B, the second ML model (e.g., an artificial neural network used to implement the second ML model) may be trained using a dataset that may include a template training representation (e.g., a heatmap or segmentation mask) of the target anatomical structures and conditions (e.g., pose and/or body shape parameters of a person) that may cause deformations to the templated training representation. Using such a training dataset, the artificial neural network used to implement the second ML model may learn an SDF field associated with the 2D or 3D space (e.g., a template space) of the template representation, and use the learned SDF field to determine the SDF value of a point in the template space under a given set of conditions. As described herein, the SDF values may indicate how far the point in the template space is from respective surfaces of the target anatomical structures and, as such, may be used to determine whether the point belongs to one of the target anatomical structures.

Figure 3C:
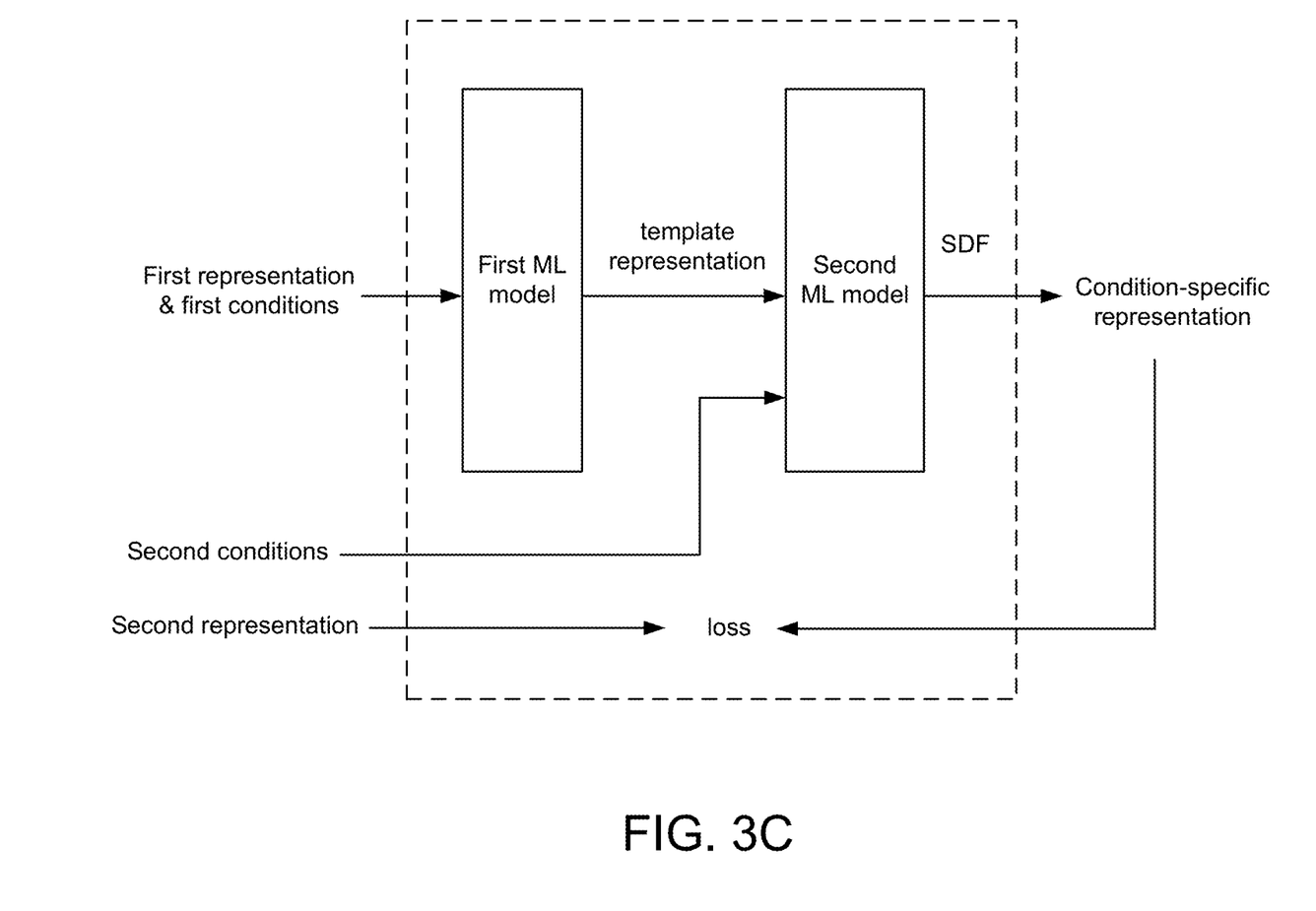
FIG. 3C is a simplified block diagram illustrating an example of jointly training the ML models shown in FIG. 3A and FIG. 3B.

The first ML model shown in FIG. 3A and the second ML model shown in FIG. 3B may be trained jointly (e.g., in an end-to-end manner) using a dataset that comprises the paired conditional representations of the target anatomical structures described herein. FIG. 3C illustrates an example of such a training technique. As shown in FIG. 3C, during a training iteration, the artificial neural network (ANN) used to implement the first ML model (e.g., referred to herein as the first ANN) may be provided with a first training representation of the target anatomical structures acquired under a first set of conditions. In response to receiving the first training representation, the first ANN may, using presently assigned neural network parameters (e.g., present parameters of the first ML model), predict a mapping between the 2D or 3D space associated with the first training representation and a 2D or 3D space associated with a template representation of the target anatomical structures based on the first training representation and a feature descriptor (not shown) for the target anatomical structures that may be extracted from the first training representation. The feature descriptor (e.g., which may include one or more feature vectors) may encode intrinsic properties of the target anatomical structures specific to the patient involved, while the template space may continuously define geometric characteristics (e.g., shapes, locations, volumes, orientations, etc.) of the target anatomical structures independent of the first set of conditions. The predicted template space mapping and a second set of conditions associated with a second representation of the target anatomical structures may then be provided to the ANN used to implement the second ML model (e.g., referred to herein as the second ANN) to predict a representation of the target anatomical structures under the second set of conditions. For example, the second ANN may model an implicit function such as an SDF for determining a continuous SDF field associated with the template 2D or 3D space, and output respective signed distances of a given point in the template 2D or 3D space that may indicate whether or not the point belongs to a specific target anatomical structure. A condition-specific representation of the target anatomical structures may then be generated (e.g., using matching cubes) based on the signed distances of multiple points from the template 2D or 3D space.

In some examples, the first set of conditions and the second set of conditions used in the joint training of the first ML model and the second ML model may be different, while in some other examples, the two sets of conditions may be the same (e.g., to add more diversity to the training data). In the latter examples, an objective of the training may be set to match the prediction made by the ML models with the input since the conditions are unchanged.

Various techniques may be used to optimize the first and second ML models (e.g., the mapping and SDF functions realized via the ML models), and/or to learn the patient-specific feature descriptor. As an example, the condition-specific representation predicted in the process described above may be compared to the second representation of the anatomical structures included in the training dataset to determine a loss between the predicted representation and the second representation (e.g., as ground truth), and the loss may be used to adjust the estimated feature descriptor and/or respective parameters of the first ANN and the second ANN, with an objective to minimize the loss. As another example, the SDF field predicted by the second ML model may be sampled to obtain respective SDF values for a plurality of points in the input data that may have ground truth SDF values. The sampled SDF values may then be compared to the ground truth SDF values to determine a loss for adjusting the estimated feature descriptor and/or the respective parameters of the first ANN and the second ANN. Once learned, the parameters of the first and second ML models may be fixed during application of the ML models (e.g., at an inference time), while a patient-specific feature descriptor may be optimized based on a given representation the target anatomical structures (e.g., derived from a medical scan of the patient) and used to predict geometric characteristics of the target anatomical structures (e.g., organ shapes) under a set of new conditions.

In examples, the training of the first ML model and the second ML model described herein may be conducted in a manner that enforces the inherent geometrical constraints between multiple anatomical structures so as to improve the accuracy of the predictions made by the ML models. An example of such a constraint may be the non-overlapping nature (which may also be referred to as non-interpenetrability) of the anatomical structures (e.g., different organs). For instance, under any set of conditions, a point $x \in \mathbb{R}^3$ may belong to at most one of the anatomical structures. As such, if a representation of the multiple anatomical structures is predicted using the multi-entity SDF function described herein, then only one entry or dimension in the distance vector z that represents the respective distances between point x and the multiple anatomical structures may have a negative value (e.g., if x belongs to anatomical structure i, then $z_i$ may have a negative value, while the rest of the entries or dimensions of vector z may all have positive values). This constraint may be used as an additional criterion to train the ML models described herein. For example, let $z^+ = \max(0, z)$ be a multi-dimensional vector defining whether x is outside anatomical structure i (e.g., if x is inside anatomical structure i, then $z_i^+ = 0$; else $z_i^+ > 0$) and let $z^- = \max(0, -z)$ be a vector defining whether x is inside anatomical structure i (e.g., if x is outside anatomical structure i, then $z_i^- = 0$; else $z_i^- > 0$), a loss $\mathcal{L}_{overlap}(x) = \sum_{i=1}^n \sum_{j=1; j \neq i}^n z_i^+ \cdot z_j^-(x)$ or $\mathcal{L}_{overlap}(x) = \text{sum}(z^+ \otimes z^-) - z^+ \cdot z^-$ may be used as an additional loss value that the ML models may aim to minimize.

In examples, in addition to or in lieu of the conditioning variables described herein (e.g., pose, body shape, body functions, etc.), the identity of a person may be treated as an additional variable within a vector of conditioning variables, or be treated separately. In the latter case, an artificial neural network may be trained to learn a patient agnostic template of one or more target anatomical structures, and predict a patient-specific template of the one or more target anatomical structures, with a machine-learned mapping from the patient agnostic template to the patient-specific template based on the identity of the person.

Figure 4:
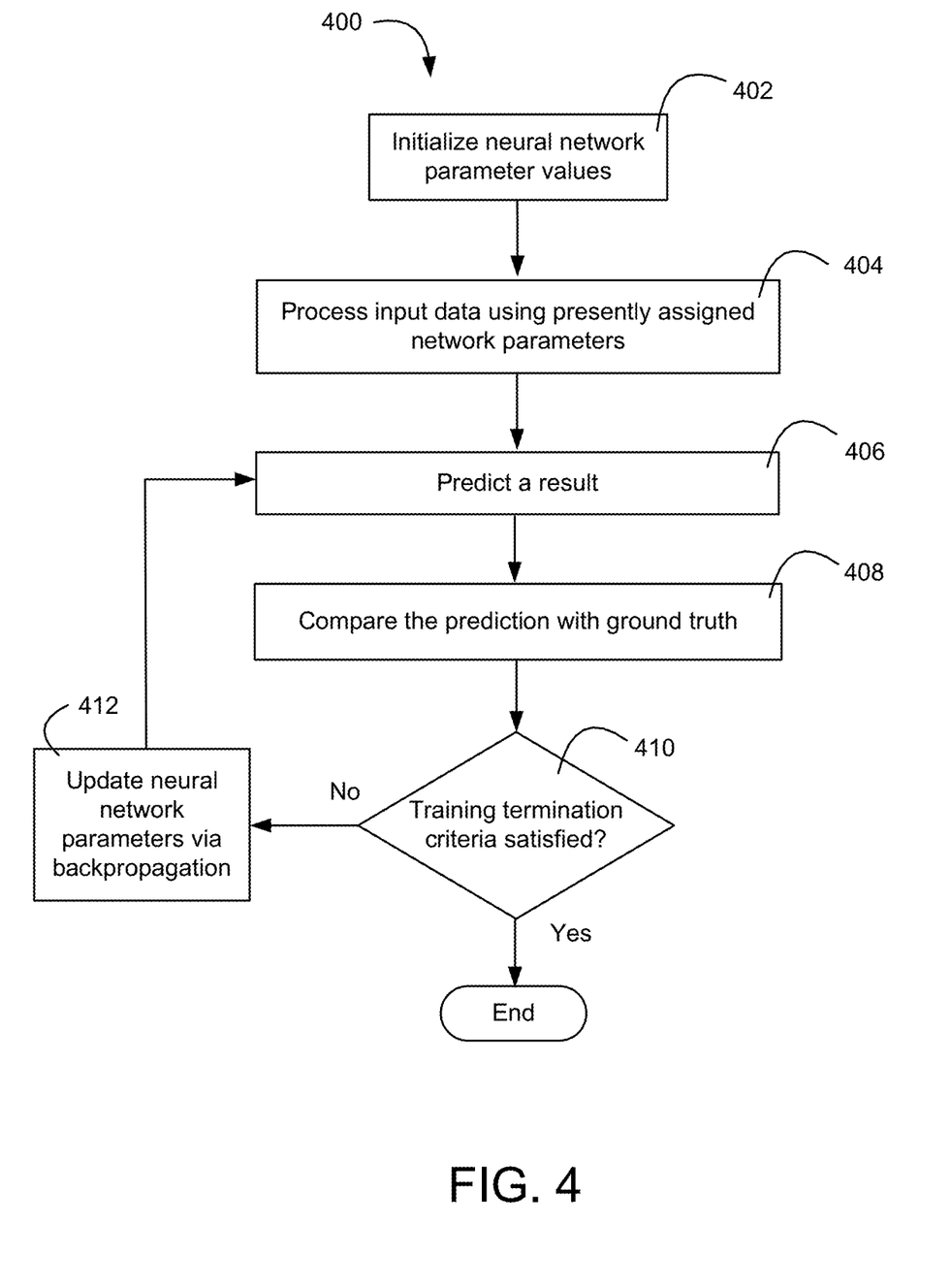
FIG. 4 is a simplified flow diagram illustrating an example process for training a neural network to perform one or more of the tasks described herein.

FIG. 4 illustrates example operations that may be associated with training a neural network (e.g., an ML model implemented by the neural network) for performing one or more of the tasks described herein. As shown, the training operations may include initializing the operating parameters of the neural network (e.g., weights associated with various layers of the neural network) at 402, for example, by sampling from a probability distribution or by copying the parameters of another neural network having a similar structure. The training operations may further include processing an input (e.g., a training representation such as a heatmap or a segmentation mask of multiple anatomical structures) using presently assigned parameters of the neural network at 404, and making a prediction for a desired result (e.g., a condition agnostic representation or a condition-specific representation of the multiple anatomical structures) at 406. The prediction result may then be compared to a ground truth at 408 to determine a loss associated with the prediction based on a loss function such as mean squared errors between the prediction result and the ground truth, an L1 norm, an L2 norm, etc. The loss may be used to determine, at 410, whether one or more training termination criteria are satisfied. For example, the training termination criteria may be determined to be satisfied if the loss is below a threshold value or if the change in the loss between two training iterations falls below a threshold value. If the determination at 410 is that the termination criteria are satisfied, the training may end; otherwise, the presently assigned network parameters may be adjusted at 412, for example, by backpropagating a gradient descent of the loss function through the network before the training returns to 406.

For simplicity of explanation, the operations of the methods are depicted and described herein with a specific order. It should be appreciated, however, that these operations may occur in various orders, concurrently, and/or with other operations not presented or described herein. Furthermore, it should be noted that not all operations that the apparatus is capable of performing are depicted in the drawings or described herein. It should also be noted that not all illustrated operations may be required to be performed.

Figure 5:
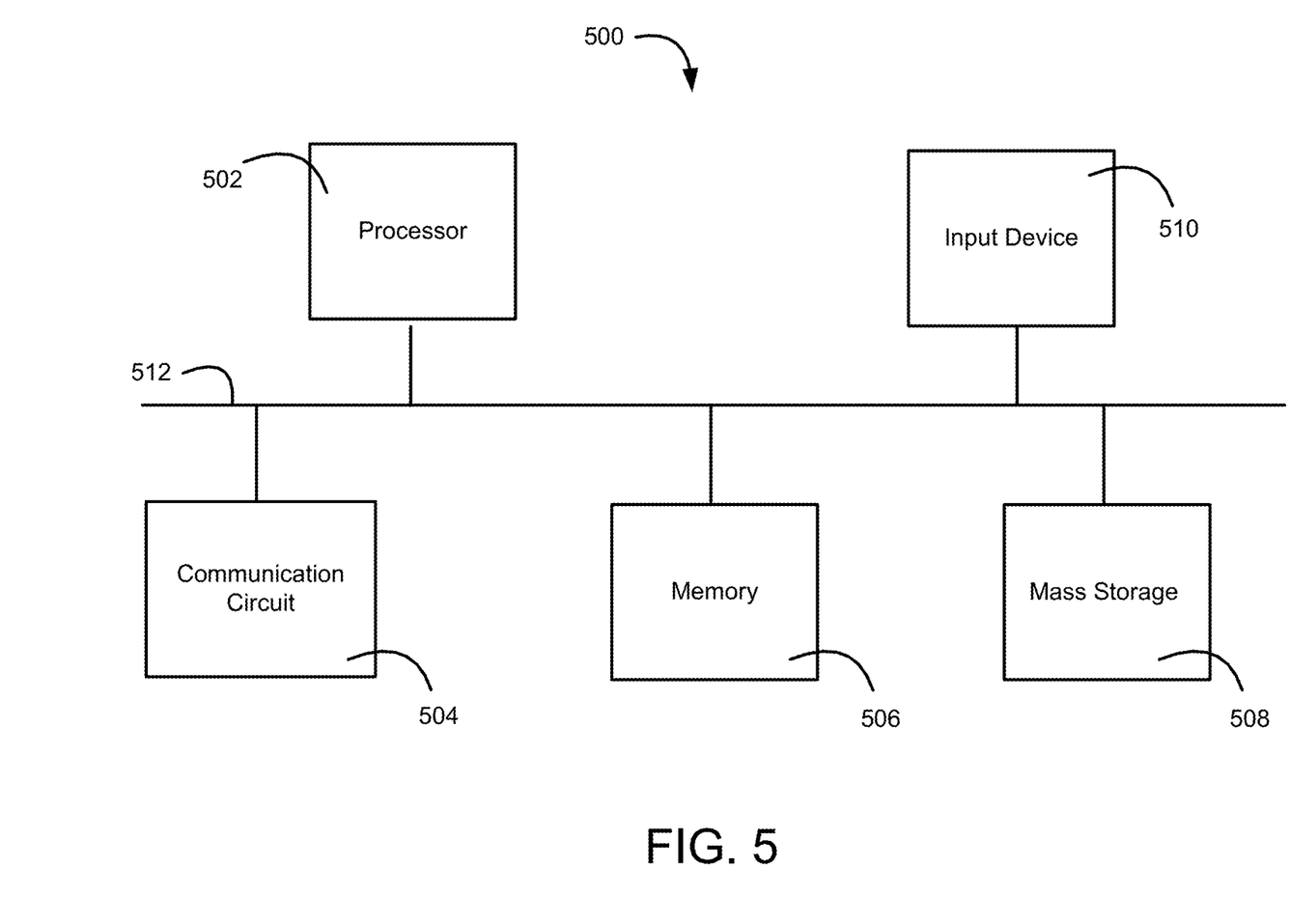
FIG. 5 is a block diagram illustrating example components of an apparatus that may be configured to perform one or more of the tasks described herein.

The systems, methods, and/or instrumentalities described herein may be implemented using one or more processors, one or more storage devices, and/or other suitable accessory devices such as display devices, communication devices, input/output devices, etc. FIG. 5 is a block diagram illustrating an example apparatus 500 that may be configured to perform the tasks described herein. As shown, apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 500 may further include a communication circuit 504, a memory 506, a mass storage device 508, an input device 510, and/or a communication link 512 (e.g., a communication bus) over which the one or more components shown in the figure may exchange information.

Communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 506 may include a storage medium (e.g., a non-transitory storage medium) configured to store machine-readable instructions that, when executed, cause processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 502. Input device 510 may include a keyboard, a mouse, a voice-controlled input device, a touch sensitive input device (e.g., a touch screen), and/or the like for receiving user inputs to apparatus 500.

It should be noted that apparatus 500 may operate as a standalone device or may be connected (e.g., networked, or clustered) with other computation devices to perform the functions described herein. And even though only one instance of each component is shown in FIG. 5, a skilled person in the art will understand that apparatus 500 may include multiple instances of one or more of the components shown in the figure.

While this disclosure has been described in terms of certain embodiments, alterations and permutations of the embodiments will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description.

What is claimed is:

1. An apparatus, comprising:
at least one processor configured to:
obtain a first representation of one or more anatomical structures of a person, wherein the first representation indicates respective geometric characteristics of the one or more anatomical structures under a first set of conditions;
determine, based at least on the first representation of the one or more anatomical structures, a feature descriptor that encodes one or more intrinsic properties of the one or more anatomical structures independent of the first set of conditions;
obtain information regarding a second set of conditions; and
generate a second representation of the one or more anatomical structures that indicates the respective geometric characteristics of the one or more anatomical structures under the second set of conditions, wherein the second representation is generated based at least on the feature descriptor, a first machine-learning (ML) model trained for mapping a three-dimensional (3D) space associated with the first representation of the one or more anatomical structures to a template 3D space associated with the one or more anatomical structures, and a second ML model trained for predicting respective distances of a point in the template 3D space to the one or more anatomical structures.

2. The apparatus of claim 1, wherein the first representation of the one or more anatomical structures includes a first segmentation mask for the one or more anatomical structures obtained based on a medical scan image of the person, and wherein the second representation of the one or more anatomical structures includes a second segmentation mask for the one or more anatomical structures.

3. The apparatus of claim 1, wherein the 3D space associated with the first representation of the one or more anatomical structures includes a plurality of discrete 3D points associated with the one or more anatomical structures, and wherein the template 3D space associated with the one or more anatomical structures includes a plurality of continuous 3D points associated with the one or more anatomical structures.

4. The apparatus of claim 1, wherein the at least one processor being configured to generate the second representation of the one or more anatomical structures comprises the at least one processor being configured to determine whether the point in the template 3D space belongs to one of the one or more anatomical structures based on the respective distances of the point to the one or more anatomical structures predicted by the second ML model.

5. The apparatus of claim 4, wherein the respective distances of the point in the template 3D space to the one or more anatomical structures are predicted as signed distances between the point and respective surfaces of the one or more anatomical structures in the template 3D space, and wherein the at least one processor is configured to determine that the point in the template 3D space belongs to the one of the one or more anatomical structures if the predicted distance between the point and the surface of the one of the one or more anatomical structures in the template 3D space is a negative distance.

6. The apparatus of claim 5, wherein the first representation and the second representation are associated with two or more anatomical structures, and wherein a constraint is imposed on the second ML model such that no more than one of the signed distances between the point and the respective surfaces of the two or more anatomical structures has a negative value.

7. The apparatus of claim 1, wherein the first ML model and the second ML model are trained jointly based at least on an input representation of the one or more anatomical structures that includes a plurality of discrete points associated with the one or more anatomical structures, and wherein, during the training of the first ML model and the second ML model:
the first ML model is used to predict a continuous 3D space associated with the one or more anatomical structures based at least on the input representation;
the second ML model is used to predict a signed distance function (SDF) field associated with the continuous 3D space; and
respective parameters of the first ML model and the second ML model are adjusted based on a difference between respective ground truth SDF values associated with the plurality of discrete points of the first representation and corresponding SDF values sampled from the SDF field.

8. The apparatus of claim 1, wherein the first set of conditions includes one or more of a first pose of the person, a first body shape of the person, or a first time value associated with the one or more anatomical structures of the person, and wherein the second set of conditions includes one or more of a second pose of the person, a second body shape of the person, or a second time value associated with the one or more anatomical structures of the person.

9. The apparatus of claim 1, wherein the feature descriptor includes a feature vector that comprises a plurality of real-valued parameters.

10. The apparatus of claim 1, wherein the first representation and the second representation are associated with two or more anatomical structures, and wherein the respective geometric characteristics of the two or more anatomical structures include respective shapes of the two or more anatomical structures.

11. A method for predicting anatomical deformations, the method comprising:
obtaining a first representation of one or more anatomical structures of a person, wherein the first representation indicates respective geometric characteristics of the one or more anatomical structures under a first set of conditions;
determining, based at least on the first representation of the one or more anatomical structures, a feature descriptor that encodes one or more intrinsic properties of the one or more anatomical structures independent of the first set of conditions;
obtaining information regarding a second set of conditions; and
generate a second representation of the one or more anatomical structures that indicates the respective geometric characteristics of the one or more anatomical structures under the second set of conditions, wherein the second representation is generated based at least on the feature descriptor, a first machine-learning (ML) model trained for mapping a three-dimensional (3D) space associated with the first representation of the one or more anatomical structures to a template 3D space associated with the one or more anatomical structures, and a second ML model trained for predicting respective distances of a point in the template 3D space to the one or more anatomical structures.

12. The method of claim 11, wherein the first representation of the one or more anatomical structures includes a first segmentation mask for the one or more anatomical structures obtained based on a medical scan image of the person, and wherein the second representation of the one or more anatomical structures includes a second segmentation mask for the one or more anatomical structures.

13. The method of claim 11, wherein the 3D space associated with the first representation of the one or more anatomical structures includes a plurality of discrete 3D points associated with the one or more anatomical structures, and wherein the template 3D space associated with the one or more anatomical structures includes a plurality of continuous 3D points associated with the one or more anatomical structures.

14. The method of claim 11, wherein generating the second representation of the one or more anatomical structures comprises determining whether the point in the template 3D space belongs to one of the one or more anatomical structures based on the respective distances of the point to the one or more anatomical structures predicted by the second ML model.

15. The method of claim 14, wherein the respective distances of the point in the template 3D space to the one or more anatomical structures are predicted as signed distances between the point and respective surfaces of the one or more anatomical structures in the template 3D space, and wherein the point is determined to belong to the one of the one or more anatomical structures in the template 3D space if the predicted distance between the point and the surface of the one of the one or more anatomical structures in the template 3D space is a negative distance.

16. The method of claim 15, wherein the one or more anatomical structures includes two or more anatomical structures, and wherein a constraint is imposed on the second ML model such that no more than one of the signed distances between the point and the respective surfaces of the two or more anatomical structures has a negative value.

17. The method of claim 11, wherein the first ML model and the second ML model are trained jointly based at least on an input representation of the one or more anatomical structures that includes a plurality of discrete points associated with the one or more anatomical structures, and wherein, during the training of the first ML model and the second ML model:

the first ML model is used to predict a continuous 3D space associated with the one or more anatomical structures based at least on the input representation;

the second ML model is used to predict a signed distance function (SDF) field associated with the continuous 3D space; and respective parameters of the first ML model and the second ML model are adjusted based on a difference between respective ground truth SDF values associated with the plurality of discrete points of the first representation and corresponding SDF values sampled from the SDF field.

18. The method of claim 11, wherein the first set of conditions includes one or more of a first pose of the person, a first body shape of the person, or a first time value associated with the one or more anatomical structures of the person, and wherein the second set of conditions includes one or more of a second pose of the person, a second body shape of the person, or a second time value associated with the one or more anatomical structures of the person.

19. The method of claim 11, wherein the feature descriptor includes a feature vector that comprises a plurality of real-valued parameters, the first representation and the second representation are associated with two or more anatomical structures, and the respective geometric characteristics of the two or more anatomical structures include respective shapes of the two or more anatomical structures.

20. A non-transitory computer-readable medium comprising instructions that, when executed by a processor included in a computing device, cause the processor to implement the method of claim 11.

* * * * *